(12) United States Patent
Chhotray et al.

(10) Patent No.: US 8,490,581 B2
(45) Date of Patent: Jul. 23, 2013

(54) ADVANCED FIRED HEATER UNIT FOR USE IN REFINERY AND PETRO-CHEMICAL APPLICATIONS

(75) Inventors: San Chhotray, Centreville, VA (US);
Thomas M. Rudy, Warrenton, VA (US);
Dennis L. Juedes, Moneta, VA (US);
James P. Norton, Ridgewood, NJ (US);
Charles E. Benson, Windham, NH (US)

(73) Assignees: ExxonMobil Research and Engineering Company, Annandale, NJ (US); Tiax, LLC., Lexington, MA (US)

( * ) Notice: Subject to any disclaimer, the term of this patent is extended or adjusted under 35 U.S.C. 154(b) by 734 days.

(21) Appl. No.: 11/808,973

(22) Filed: Jun. 14, 2007

(65) Prior Publication Data
US 2008/0115741 A1    May 22, 2008

Related U.S. Application Data

(60) Provisional application No. 60/813,713, filed on Jun. 15, 2006.

(51) Int. Cl.
*F22B 21/02* (2006.01)

(52) U.S. Cl.
USPC ..................... 122/250 R; 432/212

(58) Field of Classification Search
USPC .............. 122/250 R; 432/176, 212
See application file for complete search history.

(56) References Cited

U.S. PATENT DOCUMENTS

| | | | | |
|---|---|---|---|---|
| 2,856,905 A | * | 10/1958 | Bowen, III | 122/236 |
| 2,994,307 A | * | 8/1961 | Throckmorton et al. | 122/356 |
| 3,128,756 A | | 4/1964 | Galvin | |
| 4,166,434 A | | 9/1979 | Jensen et al. | |
| 4,180,128 A | * | 12/1979 | Fallon et al. | 165/76 |
| 5,181,990 A | | 1/1993 | Arisaki et al. | |
| 5,295,822 A | * | 3/1994 | Hemsath | 432/146 |
| 5,687,678 A | * | 11/1997 | Suchomel et al. | 122/250 R |
| 6,152,086 A | * | 11/2000 | Brouwer et al. | 122/249 |

FOREIGN PATENT DOCUMENTS

| | | |
|---|---|---|
| EP | 0519230 A1 | 12/1992 |
| FR | 2 133 306 A | 11/1972 |
| FR | 2 761 371 A | 10/1998 |
| GB | 688297 A | 3/1953 |

(Continued)

OTHER PUBLICATIONS

Ashutosh Garg, Get the Most From Your Fired Heater, Chemical Engineering, Mar. 2004, pp. 60-64.*
International Search Report, PCT/US2007/014163, mailed Dec. 6, 2007.
Written Opinion, PCT/US2007/014163, mailed Dec. 6, 2007.
Australian Patent Office Written Opinion, Form APO/SG/408, 6pgs, Oct. 19, 2009.
Australian Patent Office Search Report, Form APO/SG/210, 4pgs, Oct. 19, 2009.

*Primary Examiner* — Gregory A Wilson
(74) *Attorney, Agent, or Firm* — Glenn T. Barrett

(57) ABSTRACT

A fired heater unit is disclosed having at least one radiant heating section with each of the at least one radiant heating section having a heating element located therein. The unit includes a convection section operatively connected to the at least one radiant heating section, wherein the convection section having at least one vertically oriented convection tube. Each of the at least one convection tube being operatively connected to the at least one radiant heating section. Each of the at least one convection tube includes an inner tube having process fluid flowing therethrough, wherein the process fluid being heated by the at least one radiant heating section, and an outer tube extending along a predetermined portion of the inner tube, wherein the outer tube is spaced from the inner tube to form a flow path therebetween.

11 Claims, 6 Drawing Sheets

| | FOREIGN PATENT DOCUMENTS | | | GB | 888069 A | 1/1962 |
|---|---|---|---|---|---|---|
| GB | 745122 | * | 2/1956 | JP | 57153102 U | 9/1982 |
| GB | 745122 A | | 2/1956 | JP | 61118146 U | 7/1987 |
| GB | 757 762 A | | 9/1956 | JP | 63034416 U | 2/1988 |
| GB | 813959 A | | 5/1959 | * cited by examiner | | |

ADVANCED FIRED HEATER UNIT FOR USE IN REFINERY AND PETRO-CHEMICAL APPLICATIONS

CROSS REFERENCE TO RELATED APPLICATION

This application relates to and claims priority to U.S. Provisional Patent Application No. 60/813,713, filed Jun. 15, 2006, entitled "An Advanced Fired Heater Unit for Use In Refinery And Petro-Chemical Applications."

BACKGROUND OF THE INVENTION

1. Field of the Invention

The present invention relates to a high efficiency, low emissions fired heater unit utilizing positive pressure with a vertically arranged convection section. The use of positive pressure permits forced convective heat transfer which reduces the necessary size for heating, which results in a compact furnace design. It is contemplated that the fired heater unit in accordance with the present invention will be used in refinery and petro-chemical applications.

2. Discussion of Related Art

In petroleum refineries and petro-chemical plants, fired heaters are typically employed because these heaters can provide a higher level of heat, which typically can not be obtained from other utility sources. The conventional fired heaters presently in commercial practice contain a radiant section, a convection section, an air preheater and ultra low NOx burners. The convection section is located on top of the radiant section. The convection tubes of the convection section have a horizontal orientation.

The conventional fired heaters utilize preheated air to maximize heater efficiency. The conventional fired heaters require a balanced draft design with a forced draft blower and an induced draft blower. The forced draft blower feeds the ambient air to the preheater and then to the heater. The induced draft blower withdraws the flue gas. This arrangement, however, is prone to the ingress of additional ambient air. The ingress of ambient air has a negative impact on the operation of the heaters. As a result, the conventional fired heater must be operated at 3% or higher excess $O_2$ levels to prevent combustion related instabilities. This reduces heater efficiency such that only a typical maximum achievable heater efficiency of is 91-92% is attained. Reductions in efficiency result in increases in total NOx and greenhouse gas emissions.

With an ever increasing demand on fuel, its rising cost, and at the same time tighter regulatory control on emissions reduction, there is a need for a fired heater that maximizes heater efficiency while reducing emissions. This need especially exists in larger heaters (greater than 100 MBtu/hr).

BRIEF SUMMARY OF THE INVENTION

Aspects of embodiments of the invention relate to a fired heater unit with high efficiency, low emissions and a compact design. Increases in heater efficiency will result in reduced fuel consumption leading to energy savings and a corresponding reduction in NOx and green house gas emissions.

It is an aspect of the present invention to utilize positive pressure (i.e. above atmospheric) within the fired heater unit to prevent the ingress of ambient air. It is contemplated that the entire fired heater unit may be operated under positive pressure. The utilization of positive pressure operation permits the operation of the heater unit with lower excess $O_2$. The reduction in excess $O_2$ results in higher efficiency and lower emissions.

The utilization of positive pressure operation also permits forced convective heat transfer from the flue gas to the process fluid in the convection section of the heater. The forced convective heat transfer decreases the effective convective heat transfer surface needed to heat the process fluid, which reduces the unit size.

It is another aspect of the present invention to provide a convection section having longitudinally finned vertical tubes. The tubes have radially extending spaced fins. This arrangement enhances heat transfer to the process fluids.

It is another aspect of the present invention to provide a fired heater having a compact construction. The unique arrangement is accomplished by locating the convection section between the radiant sections.

Since the heater in accordance with the present invention operates with positive pressure throughout the heater, only forced draft blowers are necessary. No induced draft blowers are needed, which are more prone to maintenance problems than the forced draft blowers.

Utilizing forced draft (only) throughout the heater, the heater can be operated at lower excess $O_2$ levels of 1-2%. As such a potential thermal efficiency of 95% can be achieved. Additionally, as a result of higher efficiency, an estimated 3% lower NOx and green house gas emissions can be realized due to lower fuel firing.

These and other aspects can be realized by the present invention, which is directed to a fired heater unit that includes a twin cell vertical tube box type radiant section with a convection section of vertical tube orientation located between the two radiant cells. The convection section design concept in this invention is unique to fired heaters as follows. Each tube in the convection section consists of a bare and a segmented finned section with longitudinally finned tubes. The finned tube section of each tube is encased within an externally refractory lined metal sleeve forming a flue gas shell and thus providing a path for flue gas flow. The flue gas from the radiant section enters into the top of the convection section, exchanges heat with the process fluid inside the tube, first with a bare section and then with a finned section within the flue gas shell of each tube, similar to the flow path in a conventional double pipe heat exchanger. Thus the flue gas flow with respect to the process fluid flow in each tube is a combination of alternating co-current and counter-current flow in each pass. The flue gas shell around each tube is welded into a tube sheet which in turn is welded into a flue gas plenum. Flue gas from each shell exits into the plenum and flows through a high efficiency air pre-heater unit and then ducted into the exhaust stack. Ambient air from the forced draft blower is preheated in the air pre-heater unit and then ducted into the burners located on the heater floor. The forced draft blower(s) provides the preheated combustion air flow and the required head (typically 25 inches of water) for the air and flue gas flow circuit throughout the heater. There is no induced draft blower in this invention.

In accordance with aspects of the present invention, the fired heater unit includes at least one radiant heating section. Each radiant heating section includes a heating element. The fired heater unit further includes a convection section operatively connected to the at least one radiant heating section. The convection section is vertically oriented and includes at least one vertically oriented convection coil. Vertical tube orientation with top supported tubes results in lower maintenance. Elimination of induced draft blower and associated ducting, add to a lower cost design. A portion of each convection tube is operatively connected to the at least one radiant heating section.

In accordance with the present invention, each of the at least one convection tube includes an inner tube having process fluid flowing therethrough. The process fluid is heated by the at least one radiant heating section. Each convection tube also includes an outer tube extending along a predetermined portion of the inner tube. The outer tube is spaced from the inner tube to form a flow path therebetween. The flow path may include at least one radially extending fin located therein which extends outwardly from the inner tube toward the outer tube. Each fin extends the length of the outer tube. The combination of the forced convection and wider spacing between the fins practically eliminates fouling of the finned tubes. The reduction and/or elimination of fouling helps maintain design efficiency and lower maintenance costs. Each of the vertical tubes preferably includes an internal tube surrounded by longitudinally extending fins. The tube and the fins are surrounded by a refractory lined metal sleeve. The outer tube preferably includes a refractory layer surrounding the outer tube.

In accordance with an aspect of the present invention, the flow path has a first open end and a second open end. The first open end of the flow path is operatively connected to the at least one radiant heating section. With this arrangement, flue gas from the at least one radiant heating section enters the flow path through the first open end. The flue gas acts to further heat the process fluid contained within the inner tube. The second open end is operatively connected to a plenum such that flue gas traveling through the flow path exits the flow path though the second open end into the plenum. The plenum is operatively coupled to a preheater unit such that the flue gas exiting the flow path travels through the plenum to the preheater unit where the flue gas preheats the incoming ambient air.

In accordance with another aspect of the present invention, the fired heater unit includes a forced draft blower. The forced draft blower supplies ambient air to the preheater unit, which is then fed to the at least one radiant heating section. In accordance with the present invention, only a forced draft blower is needed to supply ambient air and move the same through the heater unit. As such, the heater unit operates under positive pressure.

In accordance with another aspect of the present invention, the fired heater unit includes a first radiant heating section and a second radiant heating section. The first and second heating sections are located on opposing sides of the convection unit such that the convection unit is located therebetween. The first and second radiant heating sections heat the process fluids as the process fluid flows through the convection unit.

It is contemplated that each convection tube may have a generally U-shaped inner tube. Each inner tube may include a first vertically extending section, a second vertically extending section, and a connecting section connecting the first vertically extending section to the second vertically extending section. The process fluid flows through the first vertically extending section into the connecting section and then into the second vertically extending section. Each of the vertically extending section may include an outer tube extending along a predetermined portion of the vertically extending section. Preferably, a first outer tube extends along a predetermined portion of the first vertically extending section; and a second outer tube extends along a predetermined portion of the second vertically extending section. A flow path is located between the inner tube and the first outer tube and the inner tube and the second outer tube. Each flow path has a first open end and a second open end. Each first open end of the flow path is operatively connected to the first and second radiant heating sections such that the flue gas in each of the first and second radiant heating sections enters the flow path through the first open ends. Each of the second open ends is operatively connected to a plenum such that flue gas traveling through the flow path exits the flow path though the second open end.

These and other aspects of the invention will become apparent when taken in conjunction with the detailed description and appended drawings.

BRIEF DESCRIPTION OF THE DRAWINGS

The invention will now be described in conjunction with the accompanying drawings in which.

DETAILED DESCRIPTION OF PREFERRED EMBODIMENTS

Figure 1:
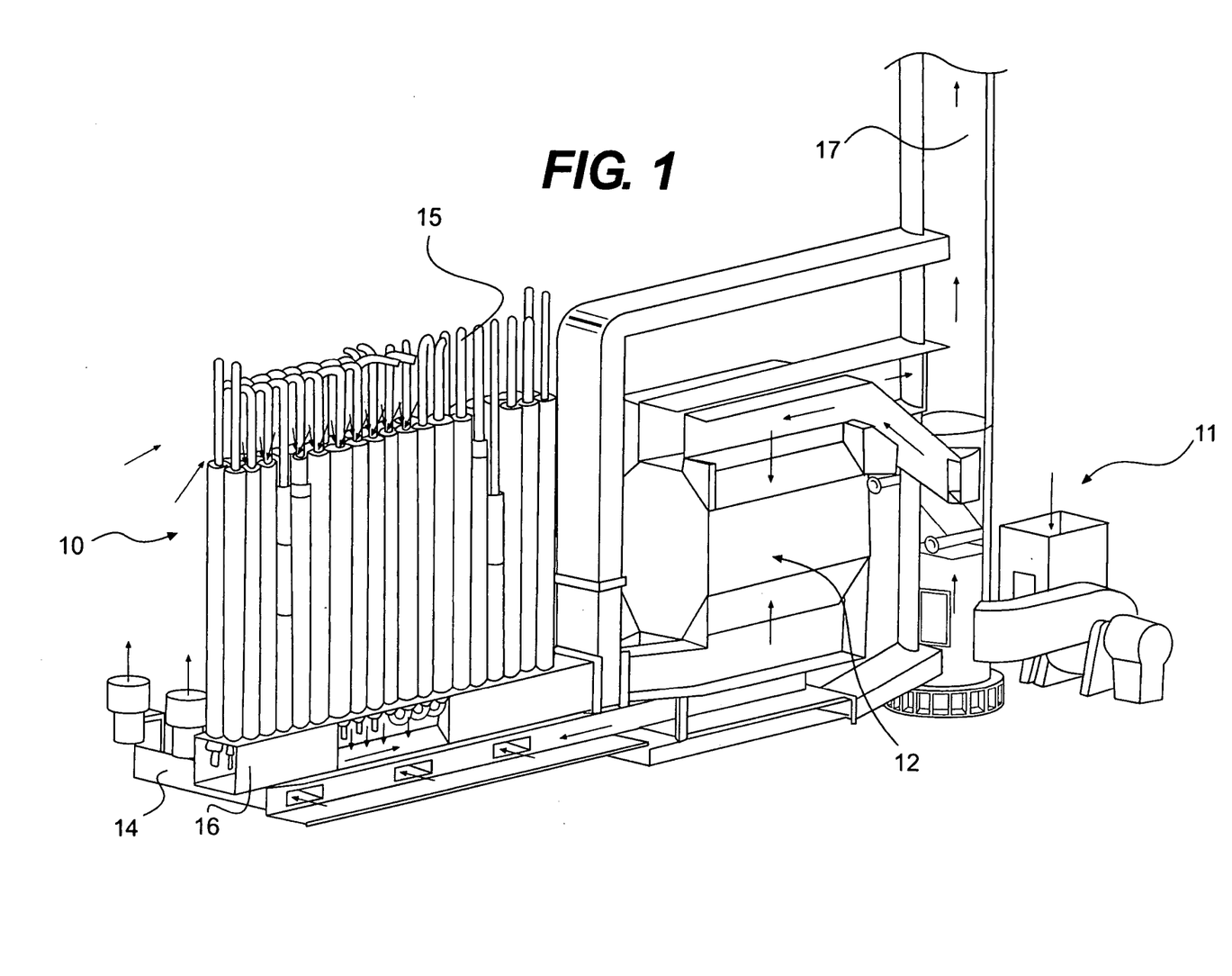
FIG. 1 is a side perspective view of an advanced fired heater unit in accordance with an embodiment of the present invention.

The present invention will now be described in greater detail in accordance with the figures. A fired heater unit 10 is illustrated in FIG. 1 in accordance with an embodiment of the present invention. The fired heater unit 10 includes a forced draft blower unit 11, which supplies ambient air to an air preheater unit 12. The forced draft blower unit 11 supplies the ambient air to air preheater unit 12 under positive pressure. The forced draft blower unit 11 operates to maintain the fired heater unit 10 under positive pressure to prevent the ingress of ambient air.

The ambient air travels through the air preheater unit 12 as illustrated in FIG. 1. The air then travels through ductwork 13. The ductwork 13 is connected to at least one radiant heating section 14 of the heater unit 10. The ductwork 13 supplies the preheated air to the radiant heating section 14. Located within each radiant heating section 14 is at least one heating element 141. The heating elements 141 further heat the preheated air. It is contemplated that each heating element 141 is a burner or other suitable heat source. The heating elements 141 are preferably ultra low NOx burners which have been commercially proven in multiple applications comprising of varying heater size, service and duty.

Figure 2:
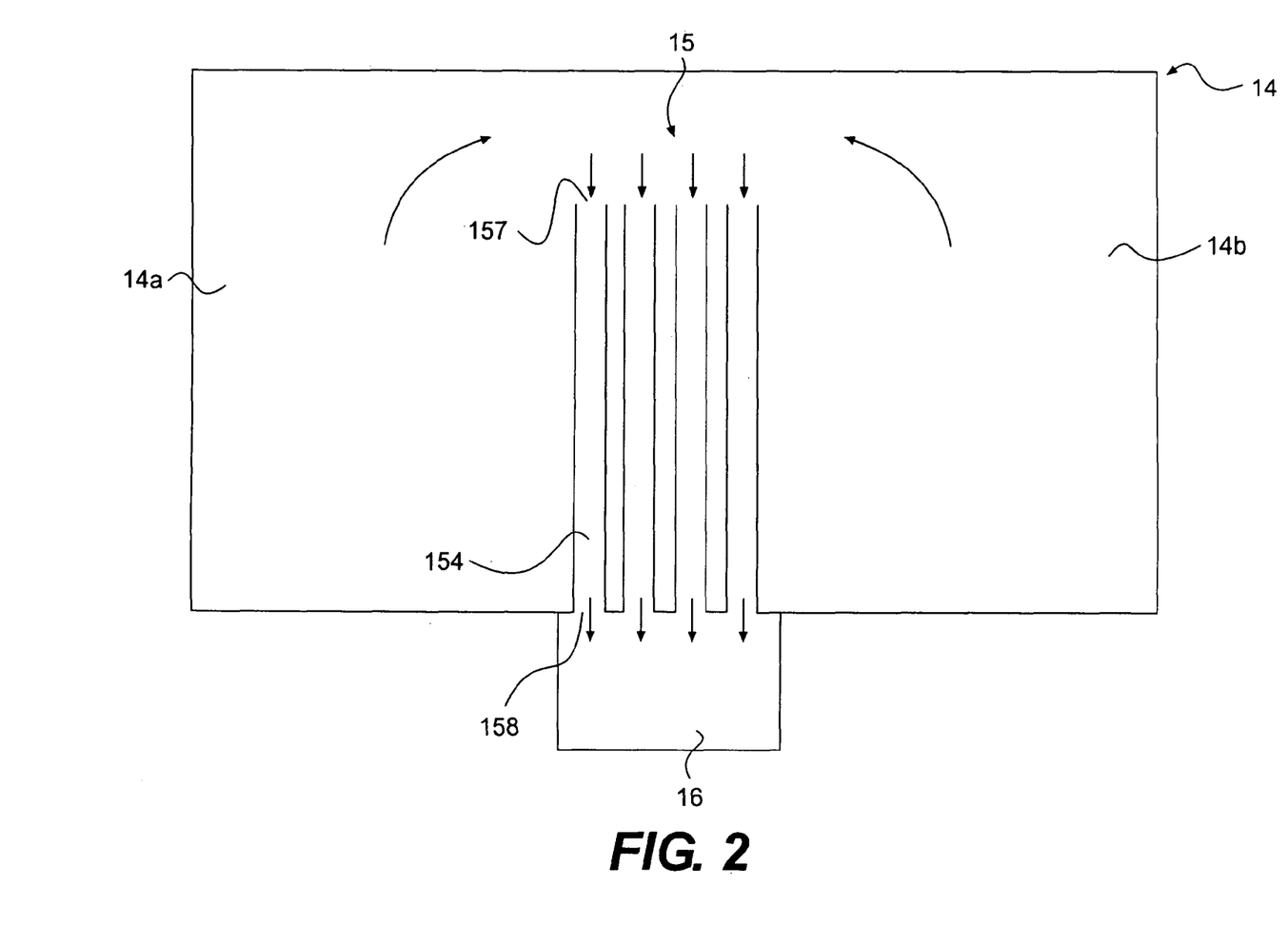
FIG. 2 is a schematic diagram of a twin cell vertical tube box type radiant section of the advanced fired heater unit of FIG. 1.

The radiant heating section 14 is surrounded by tubing 142 containing the process fluid. The heated air within the radiant heating section 14 travels upwardly, as shown in FIG. 2. Located on one side of the radiant heating section 14 is a vertically arranged convection heating section 15. The convection heating section 15 is oriented adjacent to the radiant heating section 14, such that the radiant heating section 14 and the convection heating section 15 are operatively connected. It is preferable that a pair of radiant heating sections 14a and 14b are provided, as shown in FIG. 2. Both radiant heating sections 14a and 14b are operatively connected to the convection heating section 15. With such an arrangement, the heated flue gas, which is produced when the ambient air is heated by the heating elements 141, is directed into the convection heating section 15 to heat the process fluids passing through the convection heating section 15.

Figure 3:
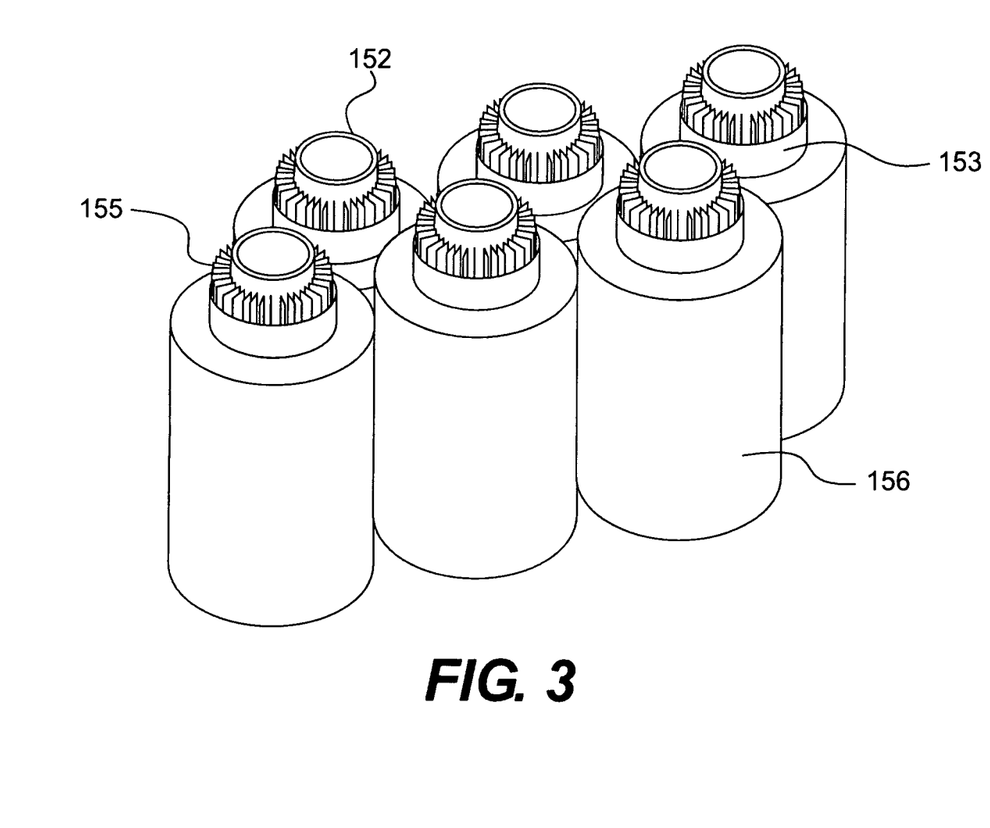
FIG. 3 is a partial perspective view of the convection section tubes.
Figure 4:
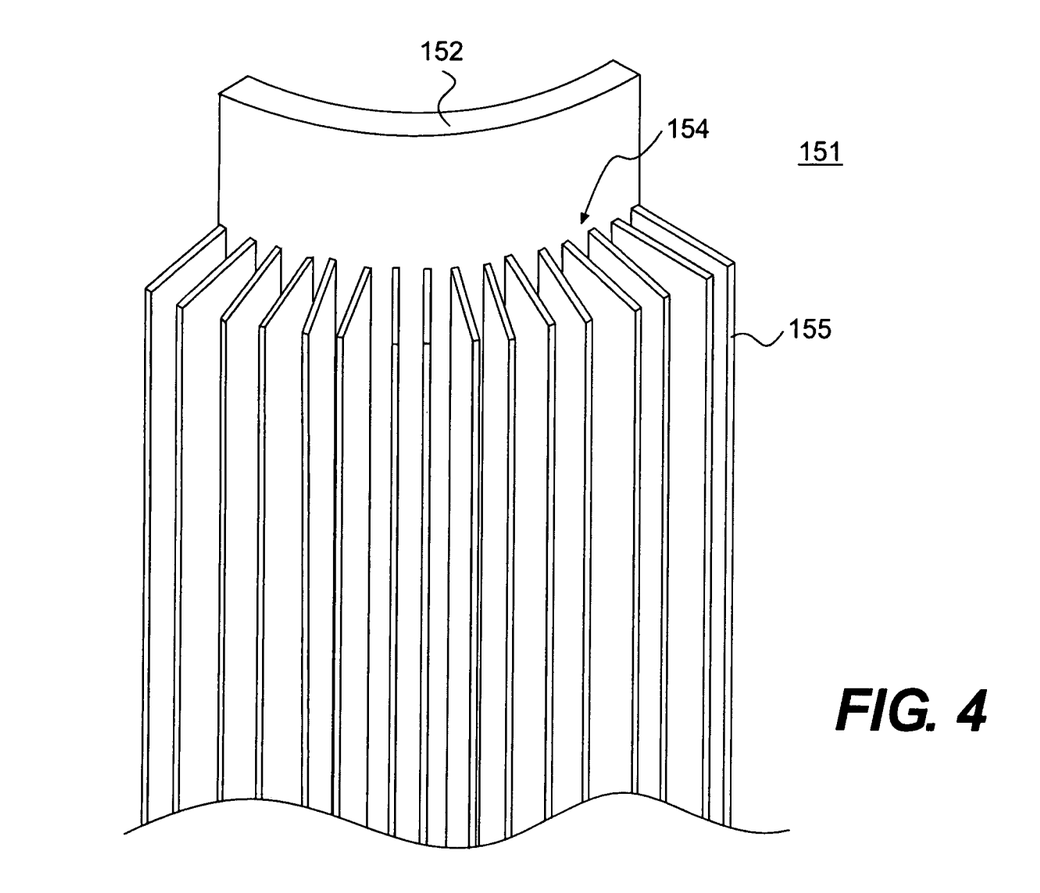
FIG. 4 is a partial perspective view of a convection tube illustrating the inner tube and the fins.
Figure 5:
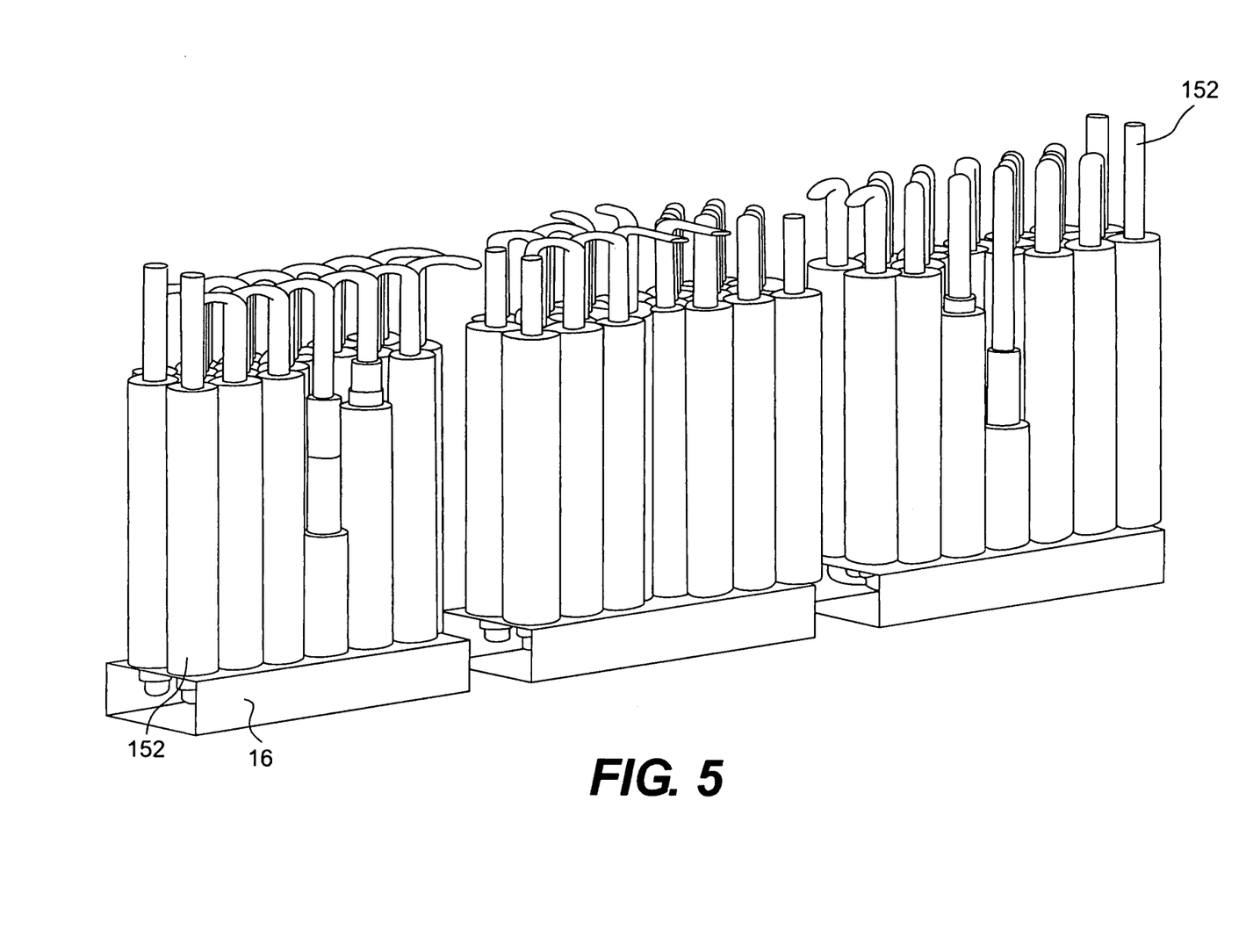
FIG. 5 is a perspective view illustrating the convection heating section according to an embodiment of the present invention.
Figure 6:
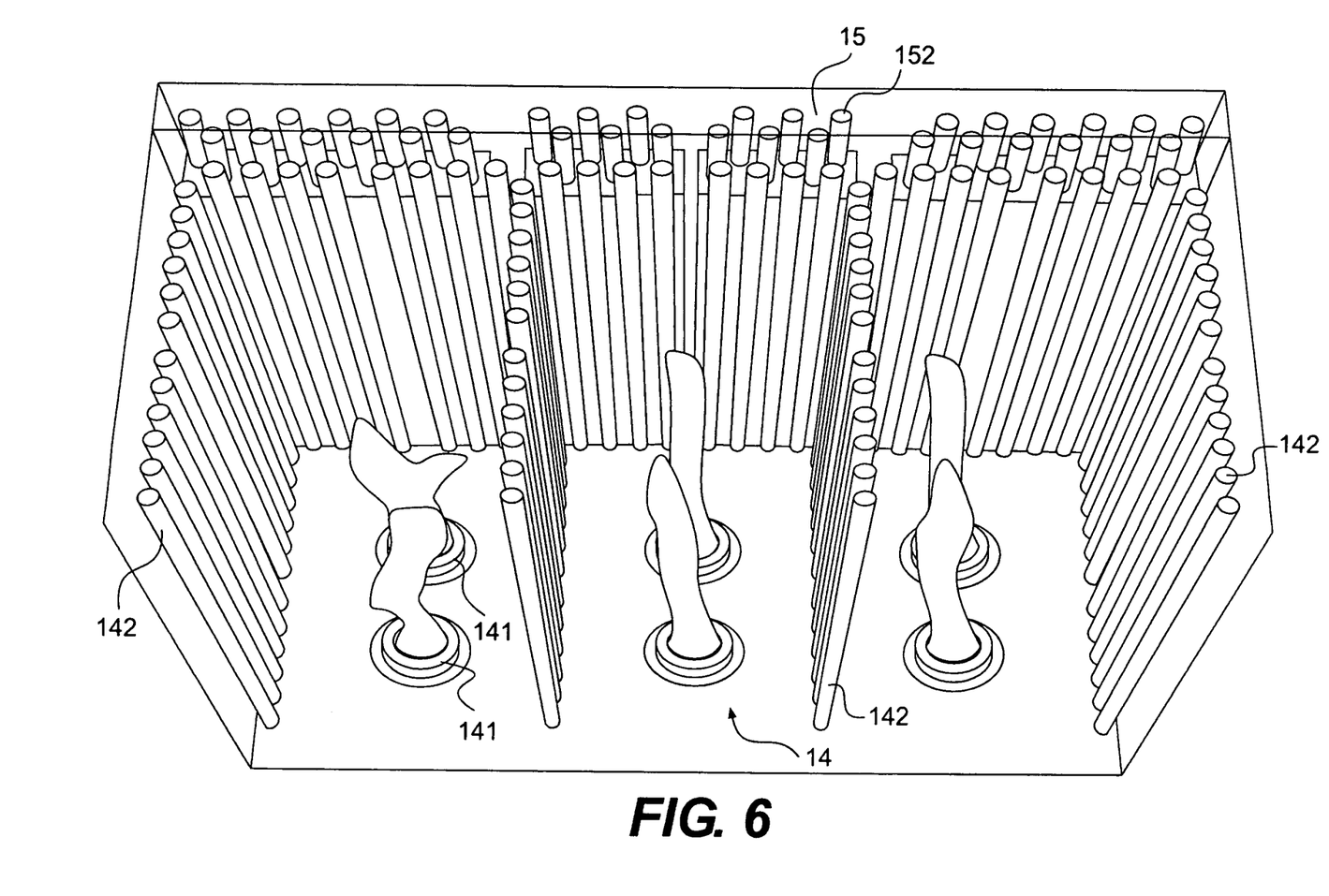
FIG. 6 is schematic view of one radiant heating section adjacent the convection heating section in accordance with the present invention.

The convection heating section 15 will now be described in greater detail in connection with FIGS. 2 and 3. The vertically oriented convection heating section 15 is positioned between the pair of radiant heating sections 14a and 14b. The convection heating section 15 includes a plurality of vertically extending tubes 151. Each vertically extending tube 151 includes an inner tube 152 through which the process fluid flows. An outer tube 153 extends along a predetermined length of the inner tube 152. It is preferable that the outer tube 153 does not extend along the entire length of the inner tube 152 for reasons that will become apparent. The outer tube 153 is spaced from the inner tube 152 such that a flow path 154 is formed therebetween. A plurality of radially extending fins 155 extend outwardly from the inner tube 152 towards the outer tube 153 within the flow path 154. The heat conductive fins 155 are sufficiently spaced within the flow path 154 to prevent fouling within the flow path 154, which could be formed by deposits on the fins 155 from the flue gas passing through the flow path 154. The outer tube 153 may contain an outer refractory layer 156.

It is contemplated that the inner tube 152 will make multiple passes through the convection heating section 15 to heat the process fluids. Each vertical section of the inner tube 152 will include an outer tube 153 that extends along a predetermined length of the inner tube 152 in the manner described above, such that each vertical section of the inner tube 152 includes a corresponding flow path formed therearound. Connection portions can be formed on the upper and lower ends of the vertical sections of the inner tube 152 to redirect the flow of process fluid into another vertical section for a pass through the convection heating section 15. It is further contemplated that each convection heating section 15 may include a plurality of separate inner tubes 152. With such an arrangement, more than one process fluid can be heated by a single convection heating section 15.

As a result of forced draft design with positive pressure throughout the heater unit 10, air ingress is eliminated which thus allows lower excess $O_2$ operation. Lower excess $O_2$ results in a correspondingly higher efficiency and lower NOx and green house gas emissions.

As shown in Table 1 below, it is estimated that the present invention provides a 3% increase in heater thermal efficiency, a 3% reduction in NOx and greenhouse gas emissions when compared to a 100 MBtu/hr conventional heater utilizing an air pre-heater. The increase is more significant when compared to a conventional heater without a pre-heater.

TABLE 1

| Heater Type | Efficiency - LHV % | Heat Fired MBTU/hr (LHV/HHV) | NOx Emissions LB/MBTU (HHV) and Tons/Yr | CO2 Emissions Lb/MBTU (HHV) and kTons/Yr |
|---|---|---|---|---|
| Conventional fired heater | 83 | 120/132 | 0.020/11.5 | 126/71.5 |
| Conventional fired heater with air preheat | 92 | 108/118 | 0.025/13 | 126/64.0 |
| Advanced Fired Heater with air preheat | 95 | 105/115 | 0.025/12.6 | 126/62.3 |

As previously mentioned, the outer tube 153 does not extend the entire length of the inner tube 152. With such an arrangement, openings 157 and 158 are formed at opposing ends of the flow path 154. A first opening 157 is located at an upper end of the outer tube 153 to permit the flow of flue gas from the radiant heating sections 14a and 14b into the flow path 154. The heated flow gas flows into the flow path 154 passing over the fins 155, which heats the fins 155. The heat is then transferred from the fins 155 to the process fluids located within the inner tube 152. Prior to entry of the flue gas into the flow path 154, the flue gas contacts the upper exposed portion of the inner tube 152. This results in the heating of the inner tube 152. The heat is then transferred to the process fluid flowing through the inner tube 152.

After the flue gas travels through the flow path 154, the flue gas exits the flow path 154 through opening 158. The outer tube 153 is connected to or extends into a plenum 16 located below the convection heating section 15. With such an arrangement, the second opening 158 is located within the plenum 16. As shown in FIG. 1, the plenum 16 is connected to the air preheater unit 12. The flue gas, which exits the convection heating section 15 into the plenum 16 travels to the air preheater unit 12, where the flue gas preheats the entering ambient air before exiting through stack 17, as shown in FIG. 1.

Various modifications can be made in the invention as described herein, and many different embodiments of the device and method can be made while remaining within the spirit and scope of the invention as defined in the claims without departing from such spirit and scope. It is intended that all matter contained in the accompanying specification shall be interpreted as illustrative only and not in a limiting sense.

What is claimed is:

1. A fired heater unit comprising:
a forced draft blower unit for supplying ambient air to the fired heater unit under positive pressure such that the fired heater unit is maintained under positive pressure;
an air preheater unit operatively connected to the forced draft blower unit;
at least one radiant heating section, wherein each of the at least one radiant heating section having a heating element located therein for heating flue gas entering the radiant heating section, and a plurality of vertically extending radiant tubes having process fluid flowing therethrough spaced from the heating element, wherein the air preheater unit is operatively connected to the at least one radiant heating section;

a convection section operatively connected and laterally positioned with respect to the at least one radiant heating section, wherein the convection section having a plurality of parallel vertically oriented convection tubes, wherein each convection tube being operatively connected to the at least one radiant heating section, wherein each convection tube having an inner tube operatively couple to one of the radiant tubes and having process fluid flowing therethrough, wherein each inner tube having more than one vertically extending section such that each inner tube making more than one pass through the convection section, and at least one outer tube extending along a predetermined portion of the inner tube, wherein each vertically extending section of the inner tube is laterally spaced and substantially parallel to the vertically extending radiant tubes, wherein each vertically extending section having an outer tube associated therewith, and each outer tube being spaced from the inner tube to form a vertical flow path therebetween, wherein the flow path having a first open upper end and a second open lower end, wherein the first open upper end of the vertical flow path is operatively connected to the at least one radiant heating section, wherein flue gas from radiant heating section enters the flow path through the first open upper end from the at least one radiant heating section and travels in a downwardly direction through the vertical flow path to the second open lower end.

2. The fired heater unit according to claim 1, further comprising:
at least one radially extending fin extending outwardly within the flow path from the inner tube toward the outer tube, wherein each of the at least one radially extending fin extending the length of the outer tube.

3. The fired heater unit according to claim 1, wherein each of the least one convection tube further comprising:
a refractory layer surrounding the outer tube.

4. The fired heater unit according to claim 1, wherein the at least one radiant heating section includes a first radiant heating section located on one side of the convection unit and a second radiant heating section located on an opposite side of the convection unit such that the convection unit is located therebetween, wherein the first open upper end of each flow path is operatively connected to the first radiant heating section and the second radiant heating section, wherein flue gas from the first and second radiant heating sections enters each flow path through the first open upper end from the at least one radiant heating section.

5. The fired heater unit according to claim 1, wherein each inner tube comprising:
a first vertically extending section;
a second vertically extending section; and
a connecting section connecting the first vertically extending section to the second vertically extending section, whereby process fluid flows through the first vertically extending section into the connecting section and then into the second vertically extending section.

6. The fired heater unit according to claim 5, wherein the second open lower end is operatively connected to a plenum such that flue gas traveling through the flow path exits the flow path through the second open end.

7. The fired heater unit according to claim 6, wherein the plenum is operatively coupled to the air preheater unit, whereby the flue gas exiting the flow path travels through the plenum to the air preheater unit to preheat the ambient air.

8. The fired heater unit according to claim 5, wherein the at least one outer tube comprising:
a first outer tube extending along a predetermined portion of the first vertically extending section; and
a second outer tube extending along a predetermined portion of the second vertically extending section.

9. The fired heater unit according to claim 8, further comprising:
at least one radially extending fin extending outwardly within the flow path from the inner tube toward the outer tube, wherein the each of the at least one radially extending fin extending the length of the outer tube.

10. The fired heater unit according to claim 1, wherein the heating element is a burner.

11. The fired heater unit according to claim 10, wherein the burner is an ultra low NOx burner.

* * * * *